(12) United States Patent
Strasser

(10) Patent No.: US 9,393,873 B2
(45) Date of Patent: Jul. 19, 2016

(54) METHOD FOR OPERATING A VEHICLE CAPABLE OF BEING DRIVEN BY AN ELECTRIC MOTOR

(75) Inventor: Roman Strasser, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 76 days.

(21) Appl. No.: 14/348,328

(22) PCT Filed: Aug. 10, 2012

(86) PCT No.: PCT/EP2012/003438
§ 371 (c)(1),
(2), (4) Date: Jun. 9, 2014

(87) PCT Pub. No.: WO2013/045009
PCT Pub. Date: Apr. 4, 2013

(65) Prior Publication Data
US 2015/0306961 A1 Oct. 29, 2015

(30) Foreign Application Priority Data
Sep. 30, 2011 (DE) .......................... 10 2011 114 549

(51) Int. Cl.
*B60L 3/12* (2006.01)
*B60L 11/18* (2006.01)

(52) U.S. Cl.
CPC ............... *B60L 3/12* (2013.01); *B60L 11/1838* (2013.01); *B60L 11/1861* (2013.01); *B60L 2260/52* (2013.01); *Y02T 10/705* (2013.01); *Y02T 10/7005* (2013.01); *Y02T 10/7044* (2013.01); *Y02T 10/7072* (2013.01);

(Continued)

(58) Field of Classification Search
CPC .......... B60L 3/00; B60L 3/12; B60L 11/1861; G06F 17/00; Y10S 903/00; Y10S 903/903
USPC ................ 701/2, 22, 36, 123; 340/635, 636.1
See application file for complete search history.

(56) References Cited

U.S. PATENT DOCUMENTS

| | | | | |
|---|---|---|---|---|
| 5,521,443 A | * | 5/1996 | Imura | ..................... B60L 1/003 180/287 |
| 5,739,674 A | * | 4/1998 | Kawahara | ............. H02J 7/0063 320/106 |

(Continued)

FOREIGN PATENT DOCUMENTS

| | | |
|---|---|---|
| DE | 103 31 084 A1 | 3/2005 |
| DE | 10 2008 039 907 A1 | 7/2009 |

(Continued)

OTHER PUBLICATIONS

International Search Report issued by the European Patent Office in International Application PCT/EP2012/003438.

*Primary Examiner* — Thomas Tarcza
*Assistant Examiner* — Tyler J Lee
(74) *Attorney, Agent, or Firm* — Henry M. Freiereisen LLC

(57) ABSTRACT

In a method for operating a vehicle (1) which can be driven with an electric motor (2) and in which the electric motor (2) is supplied with electric current from an energy store (3), a state of charge of the energy store (3) and/or a remaining distance that can be traveled with the energy stored in the energy store (3) is stored in a memory device (4). After the switching off the electric motor (2), the state of charge of the energy store (3) and/or the remaining distance that can still be traveled by the vehicle with the energy stored in the energy store (3) is transmitted to a mobile terminal (6).

6 Claims, 2 Drawing Sheets

(52) U.S. Cl.
CPC ............. *Y02T 90/121* (2013.01); *Y02T 90/128* (2013.01); *Y02T 90/14* (2013.01); *Y02T 90/163* (2013.01); *Y10S 903/903* (2013.01)

(56) References Cited

U.S. PATENT DOCUMENTS

| | | | | |
|---|---|---|---|---|
| 7,795,841 | B2 * | 9/2010 | Matsumoto | B60L 11/182 320/108 |
| 8,311,690 | B2 * | 11/2012 | Tanaka | B60K 6/48 180/65.1 |
| 8,670,885 | B2 * | 3/2014 | Gilman | B60W 50/0097 340/425.5 |
| 8,676,401 | B2 * | 3/2014 | Asada | B60L 11/1824 701/2 |
| 8,698,642 | B2 * | 4/2014 | Taguchi | B60L 3/12 340/636.1 |
| 2008/0079374 | A1 | 4/2008 | Wobben | |
| 2009/0157289 | A1 | 6/2009 | Graessley | |
| 2010/0138142 | A1 | 6/2010 | Pease | |
| 2011/0022256 | A1 | 1/2011 | Asada et al. | |
| 2011/0032110 | A1 | 2/2011 | Taguchi | |

FOREIGN PATENT DOCUMENTS

| | | |
|---|---|---|
| DE | 10 2009 029 980 A1 | 1/2011 |
| DE | 10 2009 038 431 A1 | 2/2011 |
| DE | 10 2010 038 400 A1 | 2/2011 |
| DE | 10 2009 041 409 A1 | 3/2011 |
| WO | WO 2010/033517 A2 | 3/2010 |

* cited by examiner

METHOD FOR OPERATING A VEHICLE CAPABLE OF BEING DRIVEN BY AN ELECTRIC MOTOR

CROSS-REFERENCES TO RELATED APPLICATIONS

This application is the U.S. National Stage of International Application No. PCT/EP2012/003438, filed Aug. 10, 2012, which designated the United States and has been published as International Publication No. WO 2013/045009 A1 and which claims the priority of German Patent Application, Serial No. 10 2011 113 549.8, filed Sep. 30, 2012, pursuant to 35 U.S.C. 119(a)-(d).

BACKGROUND OF THE INVENTION

The invention relates to a method for operating a vehicle capable of being driven by an electric motor. Furthermore, the invention relates to a vehicle having an electric motor for driving the latter.

A wide variety of vehicles capable of being driven by an electric motor is generally known in the art. Pure electric vehicles, i.e. vehicles which have no propulsion source other than an electric motor, may be involved here, or electric vehicles having a so-called range extender, i.e. an additional combustion engine in the electric vehicle to extend the cruising range, or so-called plug-in hybrid vehicles which have a combustion engine as the primary propulsion source of the vehicle but additionally have an electric motor with an energy store that can be charged from outside the vehicle.

A principal problem of these vehicles is their relatively low cruising range, which is due to the slight capacity of the energy store in comparison to a vehicle operated by a combustion engine. For this reason, there are currently still some reservations about these vehicles.

DE 10 2010 038 400 A1 discloses a door control and charge control for an electric vehicle. The charge amount of a battery, provided to supply the electric motor powering the vehicle, is transmitted to a mobile terminal which estimates the remaining cruising range of the vehicle on the basis thereof.

DE 10 2008 039 907 A1 describes a vehicle having an electrical energy store and an energy source which is provided with an activation device. Furthermore, a starting device is provided which is configured to wirelessly activate the activation device. In this way, the driver should be enabled to charge the electrical energy store using wireless transmission.

SUMMARY OF THE INVENTION

It is an object of the present invention to provide both a method for operating a vehicle capable of being driven by an electric motor, and a corresponding vehicle to enable a driver of such a vehicle to facilitate handling thereof.

According to one aspect of the invention, the object is achieved by a method of operating a vehicle capable of being driven by an electric motor, wherein the electric motor is supplied with electric current from an energy store, wherein a remaining distance that can be traveled with the energy stored in the energy store is stored in a memory device, and wherein after switching of the electric motor the remaining distance that can be traveled with the energy stored in the energy store is transmitted to a mobile terminal (6) by a device (5) which is connected to the memory device.

As in accordance with the invention the remaining distance that can be traveled by the vehicle is transmitted to a mobile terminal, the driver of the vehicle is informed at all times about the cruising range of the vehicle and can take steps to ensure that the energy store is adequately charged, before starting the vehicle for another trip. This considerably makes handling of such a vehicle easier for the driver.

According to an advantageous refinement of the invention, provision can be made for a transmission of the state of charge of the energy store and/or the remaining distance that can be traveled with the energy stored in the energy store, when the electric motor is switched off. In this way, it is ensured that the mobile terminal receives at all times exact data that is useful for the driver.

As an alternative or in addition, provision can be made for transmission of the state of charge of the energy store and/or the remaining distance that can be traveled with energy stored in the energy store, when a driver-side door of the vehicle is closed.

According to a further advantageous embodiment of the invention, the state of charge of the energy store and/or the remaining distance that can be traveled with the energy stored in the energy store is transmitted to a mobile phone. Transmission of data to a mobile phone ensures in a very simple way that the driver of the vehicle can easily access at all times the state of charge of the energy store or the remaining distance that can be traveled with the vehicle, especially when staying far away from the vehicle.

As an alternative or in addition, provision can be made for the transmission of the state of charge of the energy store and/or the remaining distance that can be traveled with the energy stored in the energy store to a device provided for opening and closing the vehicle and/or for starting and stopping the electric motor. This also gives the driver the option to access the respectively stored data at any time and basically at any location where s/he is staying.

This is particularly true when using a key as device for opening and closing the vehicle and/or for starting and stopping the electric motor.

According to another aspect of the invention, the object by a vehicle having an electric motor for propulsion thereof, an energy store for supplying the electric motor with electric current, a memory device for storing a remaining distance that can be traveled with the energy stored in the energy store, and a device, connected to the memory device, for transmitting the remaining distance of the vehicle that can be traveled with the energy stored in the energy store (3) to a mobile terminal.

The presence in such a vehicle of the device for transmitting to a mobile terminal the remaining distance that can be traveled by the vehicle with the energy stored in the energy store, the afore-described method can be carried out in a very simple manner to inform the driver of the vehicle at all times about the state of charge of the energy store.

According to an advantageous refinement of the vehicle according to the invention, provision can be made for configuration of the mobile terminal as a device for opening and closing the vehicle and/or for starting and stopping the electric motor. As the driver typically carries oftentimes anyway such a device for opening and closing the vehicle and/or for starting and stopping the electric motor, this solution does not add complexity in any way.

BRIEF DESCRIPTION OF THE DRAWING

An exemplary embodiment of the invention is shown in principle with reference to the drawing.

It is shown in:

FIG. 1 shows a very schematic illustration of a vehicle 1 having an electric motor 2 as propulsion. In addition to the electric motor 2, the vehicle 1 may also include a combustion engine or another auxiliary propulsion source. The electric motor 2 is supplied with electric current from an energy store 3 which is implemented as a battery 3 in the embodiment shown. Connected in the present case with the energy store 3 is a memory device 4 which is capable to store the state of charge of the energy store 3 and/or the remaining distance that can be traveled by the vehicle 1 with the energy stored in the energy store 3, i.e. the cruising range of the vehicle 1. As the state of charge of the energy store 3 and the remaining distance that the vehicle 1 can travel are directly linked to one another, the memory device 4 stores preferably both values. In addition, a device may additionally be provided which is known per se and therefore not described in greater detail and which calculates the remaining cruising range of the vehicle 1 on the basis of the state of charge of the energy store, optionally with consideration of a driving style of the driver.

DETAILED DESCRIPTION OF REFERRED EMBODIMENTS

Figure 1:
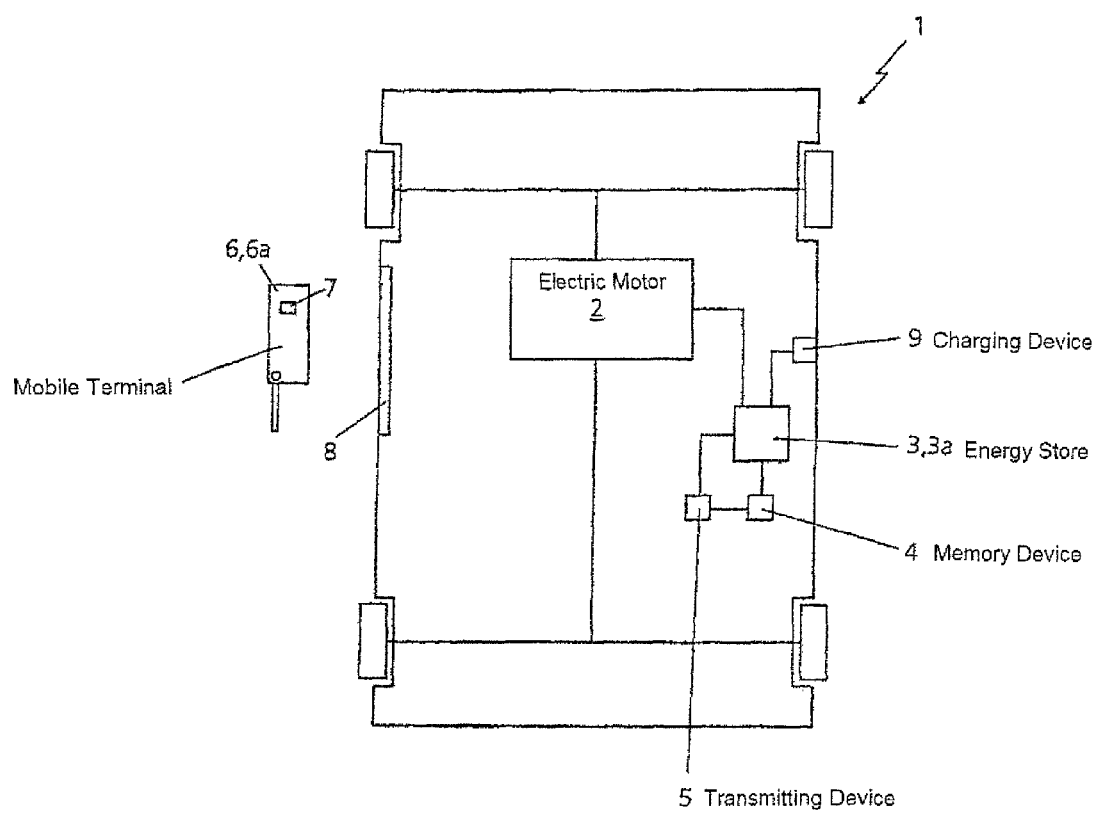
FIG. 1 an electric motor for driving a vehicle equipped therewith with which the method according to the invention can be carried out.

In addition, the vehicle 1 includes a device 5 provided to transmit the state of charge of the energy store 3 and/or the remaining distance of the vehicle 1 that can be traveled with the energy stored in the energy store 3 to a mobile terminal 6 which is located outside the vehicle 1. In the present case, the device 5 is also connected to the energy store 3. Data transmission from the device 5 to the mobile terminal 6 can be executed with measures known per se and is therefore not described in greater detail hereinafter.

The mobile terminal 6 may be configured for example as a mobile telephone or as a device provided for opening and closing the vehicle 1 and/or for starting and stopping the electric motor 2. In the present exemplary embodiment, the mobile terminal 6 involves a key 6a which has, for example, a display 7, known per se known, to indicate the state of charge of the energy store 3 and/or the remaining distance of the vehicle 1 that can be traveled with the energy stored in the energy store 3. The term "key" is to be understood as also including devices such as check cards or the like with which the driver gains access to the vehicle 1 and/or is able to start the electric motor 2 thereof. The term "mobile phone" relates to any communication device that can be carried in the vehicle 1. The presence of a connection of this mobile phone with a mobile network within the vehicle 1 is hereby not necessarily required.

The state of charge of the energy store 3 and/or the remaining distance of the vehicle 1 that can be traveled with the energy stored in the energy store 3 is stored in the memory device 4 continuously or at specific time intervals. Preferably, the state of charge of the energy store 3 and/or the remaining distance of the vehicle 1 that can be traveled with the energy stored in the energy store 3 is transmitted to the mobile terminal 6 after switching off the electric motor 2. The reference to "after switching off the electric motor 2" may relate for example to a transmission to the mobile terminal 6 immediately when switching off the electric motor 2 or after locking a driver-side door 8 of the vehicle 1.

The transmission of the state of charge of the energy store 3 and/or the remaining distance of the vehicle 1 that can be traveled with the energy stored in the energy store 3 to the mobile terminal 6 may also be executed again at a later time, e.g. at the request by the driver. This is useful, for example, during long periods of stoppage or changes in the outside temperature that affect the state of charge and therefore the cruising range.

Figure 2:
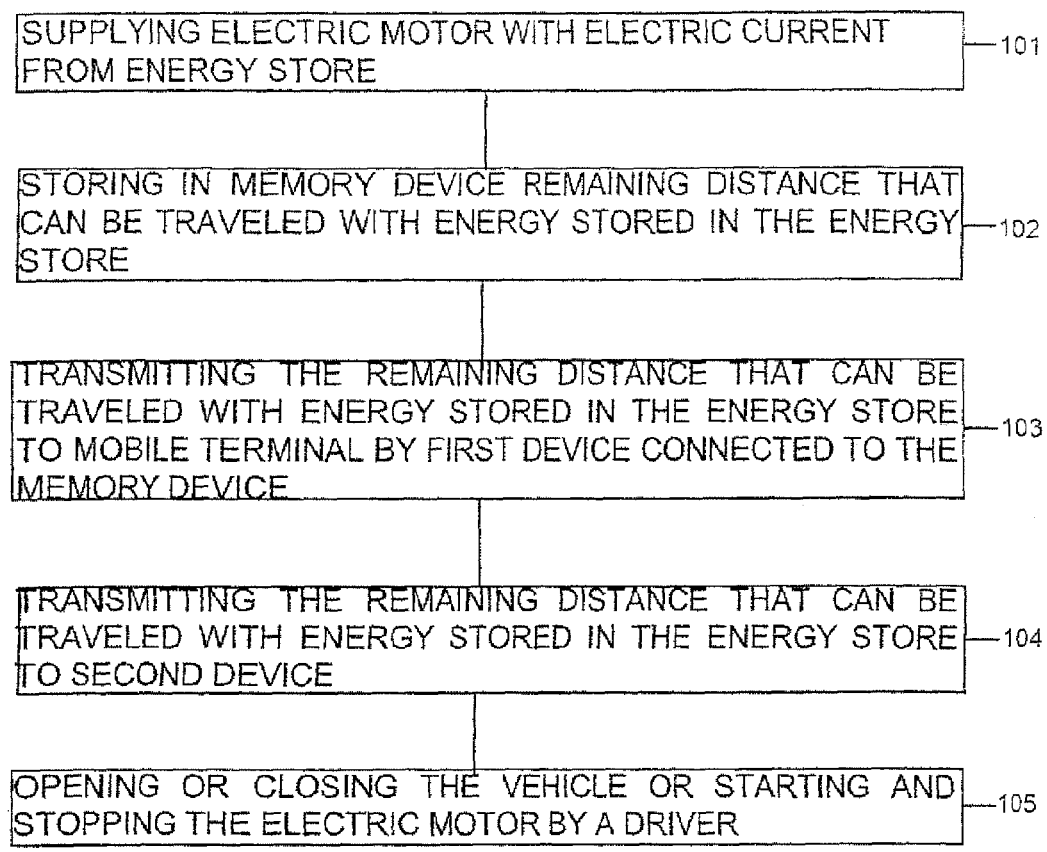
FIG. 2 a flowchart of a method of operating a vehicle according to the invention.

FIG. 2 shows a flowchart of the method of operating a vehicle according to the present invention. At step 101 the electric motor 2 of the vehicle 1 is supplied with electric current from the energy store 3 for driving the vehicle 1. At step 102 a remaining distance that can be traveled by the vehicle 1 with the energy stored in the energy store 3 is stored in a memory device 4. The remaining distance that can be traveled by the vehicle 1 with the energy stored in the energy store 3 is transmitted by the device 5 to the mobile terminal 6 at step 103. The remaining distance that can be traveled with the energy stored in the energy store 3 is transmitted at step 104 to a second device such as the key 6 with the display 7, or check cards and the like, to enable a driver to gain access to the vehicle and/or to start the electric motor 2. At step 105 the driver, as a result, gains access to the vehicle 1 (opens or closes the vehicle) and/or starts or stops the electric motor 2.

The mobile terminal 6 may optionally also be configured for permitting a control of the state of charge of the energy store 3. For example, it is possible to switch over from a normal charging power by means of the mobile terminal 6 to a fast charge after connecting the energy store 3 to a respective charging device, so that the energy store 3 is charged sufficiently enough up to a predetermined departure time so as to enable a specific cruising range, that may optionally also be inputted via the mobile terminal 6. Basically, a command to charge the energy store, optionally accompanied with a desired departure time, may be inputted via the mobile terminal 6, and a not shown control unit in the vehicle 1 could calculate an appropriate point in time to start a charging procedure and to start the charging procedure. For calculating an appropriate point in time, criteria such as protection of the energy store 3, high speed during charging of the energy store 3, or a low price for charging can be taken into consideration. Reference sign 9 designates in FIG. 1 a device on the vehicle, intended to charge the energy store 3, such as for example a plug or a socket.

The invention claimed is:

1. A method of operating a vehicle, comprising:
   supplying an electric motor with electric current from an energy store for driving the vehicle;
   storing a remaining distance that can be traveled with energy stored in the energy store in a memory device;
   transmitting the remaining distance that can be traveled with the energy stored in the energy store to a mobile terminal by a first device which is connected to the memory device, when switching off the electric motor; and
   transmitting the remaining distance that can be traveled with the energy stored in the energy store to a second device immediately after the electric motor is switched off for indicating the remaining distance and before subsequent opening and closing the vehicle or for starting the electric motor by a driver of the vehicle.

2. The method of claim 1, further comprising transmitting a state of charge of the energy store to the mobile terminal by the first device when switching off the electric motor.

3. The method of claim 2, wherein the state of charge of the energy store or the remaining distance that can be traveled with the energy stored in the energy store is transmitted to a mobile phone.

4. The method of claim 2, wherein the second device for opening and closing the vehicle or for starting and stopping the electric motor is a key.

5. A vehicle, comprising:
an electric motor for driving the vehicle;
an energy store for supplying the electric motor with electric current;
a memory device for storing a remaining distance that can be traveled with energy stored in the energy store;
a mobile terminal configured as a device for opening and closing the vehicle and/or for starting and stopping the electric motor;
a first device connected to the memory device and configured to transmit the remaining distance of the vehicle that can be traveled with the energy stored in the energy store to the mobile terminal when switching off the electric motor; and
a second device for receiving the remaining distance that can be traveled with the energy stored in the energy store immediately after the electric motor is switched off for indicating the remaining distance and before subsequent opening and closing the vehicle or for starting the electric motor by a driver of the vehicle.

6. The vehicle of claim 5, wherein the device connected to the memory device is configured for additional transmission of a state of charge of the energy store to the mobile terminal.

\* \* \* \* \*